(12) United States Patent
Moddel et al.

(10) Patent No.: US 6,760,080 B1
(45) Date of Patent: Jul. 6, 2004

(54) LIGHT MODULATING EYEWEAR ASSEMBLY

(76) Inventors: Garret R. Moddel, 450 Marine St., Boulder, CO (US) 80302; Stephen C. Shear, 2475 Blue Heron Cir., Lafayette, CO (US) 80026

( * ) Notice: Subject to any disclaimer, the term of this patent is extended or adjusted under 35 U.S.C. 154(b) by 0 days.

(21) Appl. No.: 09/377,680

(22) Filed: Aug. 19, 1999

(51) Int. Cl.[7] .............. G02F 1/1335; G02F 1/135; C07D 313/16; C07D 407/00
(52) U.S. Cl. .............. 349/13; 349/29; 349/66; 359/227; 359/237
(58) Field of Search .............. 349/13, 29, 66; 359/237, 227

(56) References Cited

U.S. PATENT DOCUMENTS

| | | | | |
|---|---|---|---|---|
| 4,152,846 A | * | 5/1979 | Witt | 35/12 B |
| 4,300,818 A | * | 11/1981 | Schachar | 351/7 |
| 4,357,083 A | * | 11/1982 | Johnson et al. | 354/22 |
| 5,067,795 A | * | 11/1991 | Senatore | 359/84 |
| 5,377,032 A | * | 12/1994 | Fergason et al. | 359/62 |
| 5,608,567 A | * | 3/1997 | Grupp | 359/275 |
| 5,841,507 A | * | 11/1998 | Barnes | 351/49 |
| 6,067,129 A | * | 5/2000 | Fergason | 349/14 |

FOREIGN PATENT DOCUMENTS

| | | | |
|---|---|---|---|
| JP | 362004769 A | * | 1/1988 |
| JP | 363004769 A | * | 1/1988 |
| JP | 403285149 A | * | 12/1991 |

* cited by examiner

Primary Examiner—Robert H. Kim
Assistant Examiner—Hoan Nguyen
(74) Attorney, Agent, or Firm—Stephan C. Shear

(57) ABSTRACT

The present invention, in accordance with one embodiment, provides for a light modulating cell assembly especially suitable as eyewear including a detector and a light blocking arrangement at least partially surrounding a detector for allowing only light from a limited range of ambient directions to directly reaching said detector. In accordance with another embodiment there is a light transmissivity control arrangement including auxiliary means for controlling the state of said light modulating medium.

19 Claims, 1 Drawing Sheet

LIGHT MODULATING EYEWEAR ASSEMBLY

BACKGROUND OF THE INVENTION

The present invention relates generally to eyewear, especially liquid crystal eyewear, whose light transmissivity can be varied and more particularly to eyewear whose transmissivity can be varied in response to and as a function of directionally controlled ambient light and still more particularly to eyewear of this type in which its light transmissity can also be varied in response to and as a function of the light intensity of a cooperating head mounted display, a computer display or other such display which is used outdoors.

Liquid Crystal eyewear used as light variable sunglasses are known in the art. For example, see for example U.S. Pat. No. 5,952,988 that issued to Moddel and that is incorporated herein by reference. This particular design and others in the art use a photo-detector to measure the ambient light reaching the glasses and changes in light transmissivity depending on the ambient light level. A problem with these different eyewear designs is that they respond generally to the surrounding ambient light. Thus, if it is a sunny day but the user, who is standing in the sun, is looking into the shade, the surrounding light will cause the eyewear to darken making it more difficult to see into the shade. As will be seen hereinafter, the present invention solves this problem by making the eyewear respond directionally to the ambient light and, thus, provides an advantage to the user who wished to focus his or her attention in a specific direction.

Another advantage of the present invention, as will also be seen, is its use with head mounted displays and computers intended to be used in ambient light of varying intensity, for example outdoors. The eyewear is designed in accordance with the present invention such that its light transmissivity is, at least in part, made responsive to and a function of the general light level of the display. Thus, in the case of, for example, a head mounted display in which the user views the display with one eye outdoors, the other eye which would otherwise be subject to the variability of ambient outdoor light can be protected by the eyewear. That is, the eyewear in accordance with the present invention can be controlled in cooperation with the head mounted display so that the light intensity reaching both eyes of the user are approximately the same.

SUMMARY OF THE INVENTION

As will be disclosed in more detail herein after, the present invention, in accordance with one embodiment provides for a light modulating cell assembly especially suitable as eyewear, comprising: (a) a light modulating cell arrangement including a light modulating medium, preferably liquid crystal, positionable in front of the eye of a user and configured so as to be able to change the state of its light modulating medium in a way which changes the transmissivity of light passing through the light modulating medium from the ambient surroundings before reaching the eye; (b) a light transmissivity control arrangement including a light detector for changing the light modulating state of said light modulating medium, at least in part, in response to and as a function of the level of light reaching said detector from the ambient surroundings; and (c) a light blocking arrangement at least partially surrounding said detector for allowing only light from a limited range of ambient directions to directly reaching said detector.

In accordance with another embodiment there is provided a light modulating cell assembly especially suitable for use for eyewear and for use with a head mounted display or a computer display having its own light intensity, comprising: (a) a light modulating cell arrangement including a light modulating medium, again preferably liquid crystal, positionable in front of the eye of a user and configured so as to be able to change the state of its light modulating medium in a way which changes the transmissivity of light passing through the light modulating medium from the ambient surroundings before reaching the eye; and (b) a light transmissivity control arrangement including auxiliary means for controlling the state of said light modulating medium such that the light passing through the light modulating medium from the ambient surroundings is maintained at a controlled intensity, at least in part, in response to and as a function of the light intensity of said display and so long as the ambient light which would otherwise reach said light detector does not drop below that intensity.

DETAILED DESCRIPTION

Figure 1:
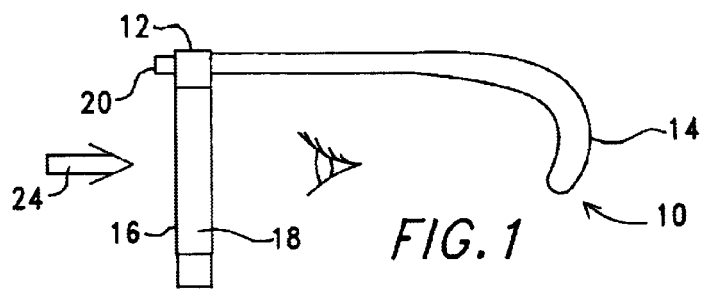
FIG. 1 is a diagrammatic illustration of liquid crystal eyewear in accordance with the present invention.

Turning now to the drawings, attention is first directed to FIG. 1 which discloses eyewear, specifically a pair of liquid crystal eyewear 10 designed in accordance with the present invention. With the exception of the present invention, the eyewear 10, may be like those in the above recited patent application or they may be conventional and readily provide by those with ordinary skill in the art. Thus, they include a frame 12 including wearing stems 14. Eyewear 10 also include a liquid crystal cell arrangement 16 including liquid crystal material 18. While not shown, the liquid crystal cell arrangement 16 includes other typical components necessary to make it work in the intended manner including a suitable light detector 20.

A typical pair of liquid crystal eyewear 10 operates to vary the light passing there through from the ambient surrounding to the user's eyes 22. Thus, as seen in FIG. 1, bright ambient light 24 is attenuated by the liquid cell arrangement 16 so that less intense light 26 reaches eyes 22. This is because the light detector 20 detects the bright light 24 and causes arrangement 16 to lighten or darken its liquid crystal material 18 in some pre-configured proportion to the brightness of light 24. The opposite is also true. That is, if the ambient surroundings are relatively dark, for example when the user walks into a shadow, the light detector 20 detects this and through its cooperating readily providable circuitry (not shown) causes arrangement 16 to lighten its liquid crystal material 18.

Figure 2A:
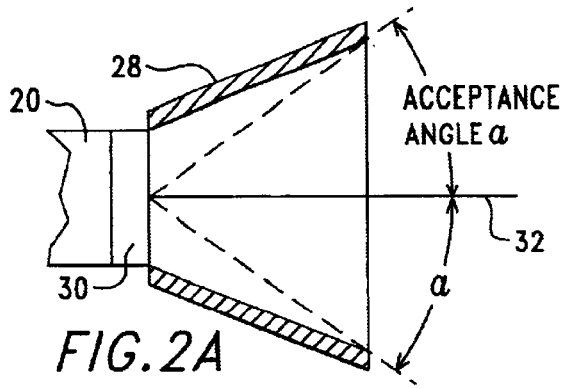
FIG. 2A is an enlarged diagrammatic illustration of a feature of the eyewear of FIG. 1, specifically of its photocell arrangement constructed in accordance with the present invention to provide light directionality to the eyewear.

In accordance with one aspect of the present invention eyewear 10 also includes a light blocking arrangement 28 shown in FIG. 2A. This arrangement 28 is configured to allow only light from a limited range of ambient directions to directly reach the detector's active surface 30. In this particular embodiment, the light blocking arrangement 28 is designed as an open ended cone with the smaller of the open ends resting against and surrounding surface 30 such that the axis 32 of the cone is normal to surface 30. In this way, only ambient light within the acceptance angle A of the cone will reach the surface 30 directly, that is, without reflecting off the inner wall of light blocking arrangement 28. In this way, if the user has his or her back or side to the sun or the sun is overhead and is looking into the shade, for example, less light will impinge on surface 30 than would be the case without arrangement 28 and eyewear 10 will remain lighter (more light transparent) than would otherwise be the case, thereby allowing the user to see better. This certainly is advantageous for a user of the liquid crystal eyewear 10 who happens to be operating a laptop computer at a table outside with the sun shining down. But for the light blocking arrangement 28, the eyewear 10 might be darker than it would otherwise be without arrangement 28, making it more difficult for the user to view the computer's display.

After having actually tested light blocking arrangement 28 with a number of different acceptance angles, it was found that the most ideal angle for acceptance angle a is about 40°. One reason for this is as follows. Without eyewear 10, if a visual image, as viewed by an individual, contains excessive bright regions within this acceptance region, they can be disturbing to the viewer. However, bright regions outside this 40° acceptance angle are not nearly as bothersome to the viewer, with or without eyewear 10.

Figure 2B:
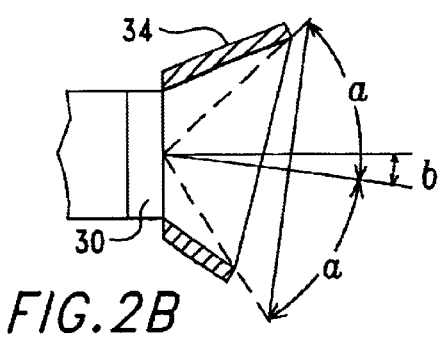
FIGS. 2B–2D are further embodiments of the arrangement of FIG. 2B.
Figure 2C:
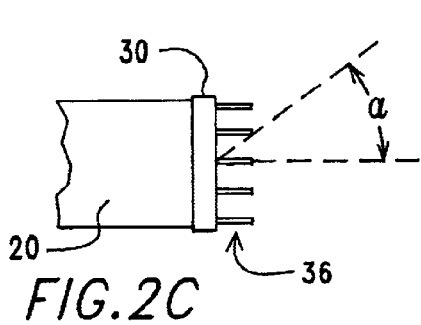
Figure 2D:
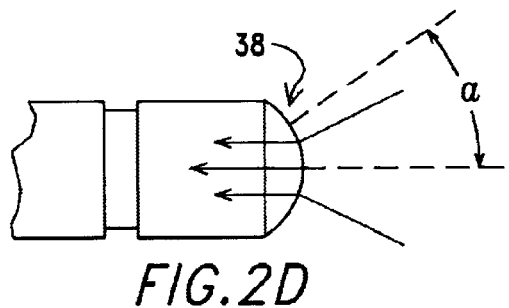

Indeed, applicants have found not only that angle a is ideally 40° but that the entire cone should be tilted downward about 10°. Thus, a second light blocking arrangement 34, tilted downward about 10°, is shown in FIG. 2B. In this case angle a remains at 40° and angle b, the tilt angle, is 10°. Clearly, it is to be understood that the generally cone shaped configurations of arrangement 28 and arrangement 34 do not have to be circular cones shapes but could take on various other shapes, for example, they could be oval, square, rectangular or the like, so long as they functioned in the manner described. Also, rather than a generally cone shaped configuration, the light blocking arrangement could be constructed of an array of louvered shutters, as in the case of arrangement 36 in FIG. 2C or any other mechanical light blocking shape. Also, it could operate to block light from active surface 30 by means of an optical lens. Such an arrangement 38 is shown in FIG. 2D. In this case, one with ordinary skill in the optics art could readily design an appropriate light blocking lens to serve as arrangement 38 and function to allow only light within the appropriate acceptance angle a to reach surface 30.

Figure 3:
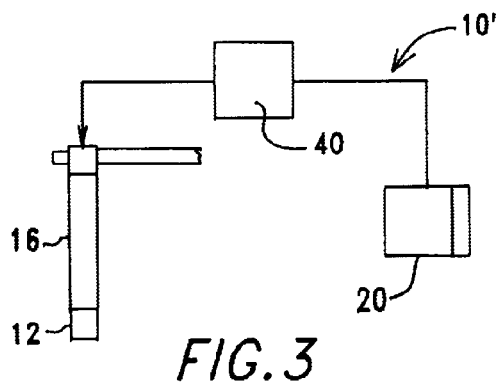
FIG. 3 is a diagrammatic illustration of liquid crystal eyewear designed in accordance with the present invention to cooperate with a head mounted display, a computer display or a like displays.

As indicated above, the light detector 20 detects the bright light 24 and causes arrangement 16 to lighten or darken its liquid crystal material 18 in some pre-configured proportion to the brightness of light 24. Typically, this is done in relatively real time in direct proportion, for example in linearly proportion with the brightness of light 24. Specifically, as the light 24 increases and decreases in brightness, as detected by light detector 20, the liquid crystal eyewear 10 respectively darkens and lightens linearly proportionately and as the brightness changes, in other words, in real time. However, while eyewear 10 can also operate in this way, in accordance with another aspect of the present invention, it is provided with delay circuitry so as not to flicker back and forth between brightness levels if the eyewear 10 is subjected to rapid changes in brightness such as, for example, the strobe effect that occurs when the user rides under trees. In this and similar cases, the delay prevents the eyewear 10 from switching back and forth. If this effect is short lived, eyewear 10 remains at the level it was at the beginning of the strobe effect. On the other hand, if the strobe effect continues, the eyewear 10 is provided with light integrating circuitry which averages the light and dark extremes reaching its light detector 20 so that the eyewear 10 stays at a generally constant level somewhere between the extremes. FIG. 3 illustrates this particular configuration with both the delay and integration features as eyewear 10' generally. Eyewear 10' includes the same liquid crystal cell arrangement 16 and frame 12 as well as light detector 20, as illustrated diagrammatically in FIG. 3. However, the circuitry 40 cooperating with detector 20 to drive the liquid crystal cell arrangement 16 in response to and as a function of the light received at detector 20 includes all of the circuit components including a delay circuit and an integration circuit to operate eyewear 10' in the manner just described. While circuitry 40 is not shown in detail, it will be appreciated that one with ordinary skill in the art, in view of the teachings herein, would be able to readily provide necessary circuit components.

Still referring to FIG. 3, Circuitry 40 can also be readily provided in accordance with still another aspect of the present invention with a circuit that insures that the transmissivity of liquid crystal cell arrangement 16 remains at a pre-adjusted constant intensity. In this way, the constant intensity can be selected to correspond to that of a head mounted display, a computer display or the like which generally operates at an approximately constant intensity. In this way, the eyewear 10', in this case operating as a monocle, could be used by one eye of the user so as to control the ambient light while viewing the display. Obviously, this assumes that the ambient light does not drop in intensity below the pre-adjusted level.

Figure 4:
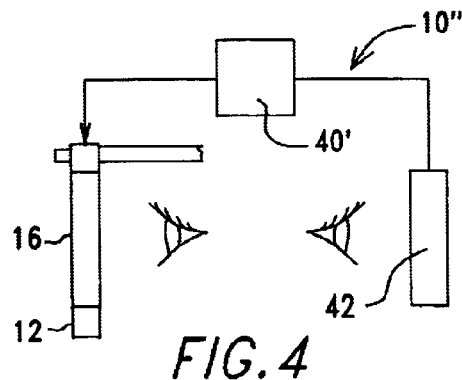
FIG. 4 is a diagrammatic illustration of liquid crystal eyewear in accordance with still another embodiment of the present invention.

Referring now to FIG. 4, still another eyewear embodiment is illustrated, specifically eyewear 10". Like the earlier described embodiments, this one includes the same arrangement 16 and frame 12. It does not necessarily require a light detector 20 but does include circuitry 40' which connects with both arrangement 16 and a display 42, for example a head mounted display, a computer display or the like, as shown in FIG. 4. This circuitry 40' includes the necessary circuit components to insure that the transmissivity of arrangement 16 tracks that of the display. While circuitry 40' is not shown in detail, it will be appreciated that one with ordinary skill in the art, in view of the teachings herein, would be able to readily provide necessary circuit components.

In all of the cases described above, the eyewear described includes a light transmissivity modulating means in the form of a liquid crystal cell arrangement. It is to be understood that other modulators could be provided such as electrochromic and suspended particle devices. Also, while only the mechanical cone was shown in both on-axis and tilted axis positions, it is to be understood that other embodiment shown on-axis could readily be provided in tilted position similar to FIG. 2B.

TABLE OF REFERENCES

| Element/Reference | Total Count | Page and Line Locations |
|---|---|---|
| eyewear 10 | 22 | Page 3 line 27 |
| | | Page 3 line 28 |
| | | Page 4 line 1 |
| | | Page 4 line 6 |
| | | Page 4 line 17 |
| | | Page 4 line 28 |
| | | Page 4 line 30 |
| | | Page 5 line 2 |
| | | Page 5 line 8 |
| | | Page 5 line 12 |
| | | Page 6 line 6 |
| | | Page 6 line 8 |
| | | Page 6 line 10 |
| | | Page 6 line 13 |
| | | Page 6 line 13 |
| | | Page 6 line 15 |
| | | Page 6 line 17 |
| | | Page 6 line 19 |
| | | Page 6 line 19 |
| | | Page 6 line 24 |
| | | Page 7 line 4 |
| | | Page 7 line 10 |
| frame 12 | 3 | Page 4 line 1 |
| | | Page 6 line 20 |
| | | Page 7 line 11 |
| stems 14 | 1 | Page 4 line 1 |
| arrangement 16 | 12 | Page 4 line 2 |
| | | Page 4 line 3 |
| | | Page 4 line 8 |
| | | Page 4 line 10 |
| | | Page 4 line 14 |
| | | Page 6 line 2 |
| | | Page 6 line 20 |
| | | Page 6 line 22 |
| | | Page 7 line 1 |
| | | Page 7 line 11 |
| | | Page 7 line 12 |
| | | Page 7 line 15 |
| material 18 | 4 | Page 4 line 2 |
| | | Page 4 line 11 |
| | | Page 4 line 15 |
| | | Page 6 line 2 |
| detector 20 | 10 | Page 4 line 4 |
| | | Page 4 line 9 |
| | | Page 4 line 13 |
| | | Page 6 line 1 |
| | | Page 6 line 6 |
| | | Page 6 line 16 |
| | | Page 6 line 20 |
| | | Page 6 line 21 |
| | | Page 6 line 23 |
| | | Page 7 line 12 |
| eyes 22 | 2 | Page 4 line 7 |
| | | Page 4 line 9 |
| light 24 | 7 | Page 4 line 8 |
| | | Page 4 line 10 |
| | | Page 4 line 11 |
| | | Page 6 line 1 |
| | | Page 6 line 3 |
| | | Page 6 line 5 |
| | | Page 6 line 5 |
| light 26 | 1 | Page 4 line 9 |
| arrangement 28 | 9 | Page 4 line 18 |
| | | Page 4 line 18 |
| | | Page 4 line 21 |
| | | Page 4 line 25 |
| | | Page 4 line 28 |
| | | Page 5 line 2 |
| | | Page 5 line 3 |
| | | Page 5 line 6 |
| | | Page 5 line 18 |
| surface 30 | 7 | Page 4 line 20 |
| | | Page 4 line 22 |
| | | Page 4 line 23 |
| | | Page 4 line 24 |
| | | Page 4 line 27 |
| | | Page 5 line 25 |
| | | Page 5 line 28 |
| axis 32 | 1 | Page 4 line 22 |
| angle a | 6 | Page 4 line 24 |
| | | Page 5 line 7 |
| | | Page 5 line 11 |
| | | Page 5 line 14 |
| | | Page 5 line 17 |
| | | Page 5 line 28 |
| arrangement 34 | 2 | Page 5 line 16 |
| | | Page 5 line 19 |
| angle b | 1 | Page 5 line 17 |
| arrangement 36 | 1 | Page 5 line 23 |
| arrangement 38 | 2 | Page 5 line 25 |
| | | Page 5 line 27 |
| eyewear 10' | 4 | Page 6 line 19 |
| | | Page 6 line 19 |
| | | Page 6 line 24 |
| | | Page 7 line 4 |
| circuitry 40 | 6 | Page 6 line 21 |
| | | Page 6 line 25 |
| | | Page 6 line 29 |
| | | Page 7 line 12 |
| | | Page 7 line 14 |
| | | Page 7 line 16 |
| eyewear 10" | 1 | Page 7 line 10 |
| circuitry 40' | 3 | Page 7 line 12 |
| | | Page 7 line 14 |
| | | Page 7 line 16 |
| display 42 | 1 | Page 7 line 13 |

What is claimed is:

1. A light modulating cell assembly for use in eyewear to be worn over at least one eye of a user, comprising:

(a) a closed looped frame adapted to be positioned over an eye of the user of the eyewear and a light modulating cell arrangement located within said frame and defining a closed looped edge substantially adjacent said closed looped shaped frame, said cell arrangement including at least one layer of a light modulating medium extending continuously within and to said edge so as to close the area within the frame, said cell arrangement being positionable in front of the eye of a user and configured so as to be able to vary the transmissivity of its continuously extending light modulating medium in a way which varies the transmissivity of light passing through the light modulating medium from the ambient surroundings before reaching the eye;

(b) a light transmissivity control arrangement including a light detector for varying the transmissivity of the entire continuous extent of said light modulating medium at least in part, in response to and as an inverse function of the level of light reaching said detector from the ambient surroundings; and (c) a light blocking arrangement at least partially surrounding said detector for allowing only light from a limited range of ambient directions to directly reach said detector.

2. A light modulating cell assembly especially suitable for use for eyewear and for use with a head mounted display or a computer display having its own light intensity, comprising:

(a) a light modulating cell arrangement defining a closed looped edge and including at least one layer of a light modulating medium extending continuously within and to said edge so as to close the area within the edge, said cell arrangement being positionable in front of the eye of a user and configured so as to be able to vary the transmissivity of its continuously extending light modulating medium in a way which varies the transmissivity of light passing through the light modulating medium from the ambient surroundings before reaching the eye; and (b) a light transmissivity control arrangement including auxiliary means for controlling the state of the entire continuous extent of said light modulating medium substantially uniformly throughout said entire continuous extent such that the light passing through the light modulating medium from the ambient surroundings is maintained at an controlled intensity, at least in part, in response to and as a function of the light intensity of said display and so long as the ambient light which would otherwise reach said light detector does not drop below the intensity of the display.

3. A liquid crystal cell assembly for use in eyewear to be worn over at least one eye of a user, comprising:

(a) a closed looped frame adapted to be positioned over an eye of the user of the eyewear and a liquid crystal cell arrangement located within said frame and defining a closed looped edge substantially adjacent said closed looped shaped frame, said cell arrangement including at least one layer of a liquid crystal medium extending continuously within and to said edge so as to close the area within the frame, said cell arrangement being positionable in front of the eye of a user and configured so as to be able to vary the transmissivity of its continuously extending liquid crystal medium in a way which varies the transmissivity of light passing through the liquid crystal medium from the ambient surroundings before reaching the eye;

(b) a light transmissivity control arrangement including a light detector for varying the transmissivity of the entire continuous extent of said liquid crystal, at least in part, in response to and as inverse function of the level of light reaching said detector from the ambient surroundings; and (c) a light blocking arrangement at least partially surrounding said detector for allowing only light from a limited range of ambient directions to directly reaching said detector.

4. An assembly according to claim 3 wherein said light detector includes a light detecting surface and wherein said light blocking arrangement cooperates with said light detector so as to define a central axis extending to said surface from the ambient surroundings, said light blocking arrangement being configured so as to allow only light within a predetermined acceptance angle to impinge on said light detecting surface directly.

5. An assembly according to claim 4 wherein said central axis is generally normal to said light detecting surface.

6. An assembly according to claim 4 wherein said central axis defines an acute angle with said light detecting surface.

7. An assembly according to claim 4 wherein said predetermined acceptance angle is about 40°.

8. An assembly according to claim 7 wherein said central axis is tilted downwards and defines an acute angle of about 10° with said light detecting surface.

9. An assembly according to claim 3 wherein said light blocking arrangement is a cone shaped light blocking member.

10. An assembly according to claim 3 wherein said light blocking arrangement is a set of louver shaped members.

11. An assembly according to claim 3 wherein said light transmissivity control arrangement includes auxiliary means for controlling the state of said liquid crystal such that the light passing through the liquid crystal from the ambient surroundings is of an overall generally constant intensity so long as the ambient light which would otherwise reach said light detector does not drop below said generally constant intensity.

12. An assembly according to claim 11 wherein the assembly is especially suitable for use with a head mounted display or computer display having its own overall generally constant intensity and wherein the auxiliary means controls the light passing through the liquid crystal from the ambient surroundings such that the latter is of an overall generally constant intensity substantially equal to that of said head mounted display.

13. An assembly according to claim 3 wherein the assembly is especially suitable for use with a head mounted display or a computer display having its own light intensity and wherein said light transmissivity control arrangement includes auxiliary means for controlling the state of said liquid crystal such that the light passing through the liquid crystal from the ambient surroundings is an intensity substantially equal to that of said head mounted display so long as the ambient light which would otherwise reach said light detector does not drop below that intensity.

14. A liquid crystal cell assembly especially suitable for use for eyewear and for use with a head mounted display or a computer display having its own light intensity, comprising:

(a) a liquid crystal cell arrangement defining a closed looped edge and including at least one layer of liquid crystal extending continuously within and to said edge so as to close the area within the edge, said cell arrangement being positionable in front of the eye of a user and configured so as to be able to vary the transmissivity of the entire continuous extent of its liquid crystal in a way which varies the transmissivity of light passing through the liquid crystal from the ambient surroundings before reaching the eye;

(b) a light transmissivity control arrangement including auxiliary means for varying the transmissivity of the continuous extent of said liquid crystal substantially uniformly throughout said entire continuous extent such that the light passing through the liquid crystal from the ambient surroundings is maintained at a controlled intensity, at least in part, in response to and as a function of the light intensity of said display and so long as the ambient light which would otherwise reach said light detector does not drop substantially below the intensity of the display.

15. An assembly according to claim 14 wherein said controlled intensity is substantially equal to that of said display.

16. An assembly according to claim 14 including a light blocking arrangement at least partially surrounding said detector for allowing only light from a limited range of ambient directions to directly reaching said detector.

17. A liquid crystal cell assembly especially suitable as eyewear, comprising:

(a) a liquid crystal cell arrangement defining a closed looped edge and including at least one layer of liquid crystal extending continuously within and to said edge so as to close the area within the edge, said cell arrangement being positionable in front of the eye of a user and configured so as to be able to vary the transmissivity of the entire continuous extent of its liquid crystal in a way which varies the transmissivity of light passing through the liquid crystal from the ambient surroundings before reaching the eye;

(b) a light transmissivity control arrangement including a light detector for varying the transmissivity of the entire continuous extent of said liquid crystal substantially uniformly throughout said entire continuous extent, at least in part, in response to and as an inverse function of the level of light reaching said detector from the ambient surroundings; and (c) circuitry including a delay circuit for delaying any variation in transmissivity of said liquid crystal with changes in the level of light reaching said detector.

18. A liquid crystal cell assembly especially suitable as eyewear, comprising:

(a) a liquid crystal cell arrangement defining a closed looped edge and including at least one layer of liquid crystal extending continuously within and to said edge so as to close the area within the edge, said cell arrangement being positionable in front of the eye of a user and configured so as to be able to vary the transmissivity of the entire continuous extent of its liquid crystal in a way which varies the transmissivity of light passing through the liquid crystal from the ambient surroundings before reaching the eye;

(b) a light transmissivity control arrangement including a light detector for varying the transmissivity of the entire continuous extent of liquid crystal substantially uniformly throughout said entire continuous extent, at least in part, in response to and as an inverse function of the level of light reaching said detector from the ambient surroundings; and (c) circuitry including a delay circuit for integrating over time the light that reaches said detector and causing the transmissivity of said liquid crystal to remain constant depending on the amount of light integrated over time.

19. A liquid crystal cell assembly forming part of eyewear including a closed looped frame configured to extend around and in front of the eye of a user, comprising:

(a) a liquid crystal cell arrangement defining a closed looped edge substantially adjacent said frame and including at least one layer of liquid crystal extending continuously within and to said edge so as to close the area within the edge, said cell arrangement being positionable in front of the eye of a user and configured so as to be able to vary the transmissivity of the entire continuous extent of its liquid crystal in a way which varies the transmissivity of light passing through the liquid crystal from the ambient surroundings before reaching the eye;

(b) a light transmissivity control arrangement including a light detector for varying the transmissivity of the entire continuous extent of said liquid crystal substantially uniformly throughout said entire continuous extent, at least in part, in response to and as an inverse function of the level of light reaching said detector from the ambient surroundings; and (c) a light blocking arrangement positioned relative to said detector for allowing only light from a limited range of ambient directions to reach said detector.

* * * * *